(12) United States Patent
Tseng et al.

(10) Patent No.: US 8,768,023 B2
(45) Date of Patent: Jul. 1, 2014

(54) METHOD FOR DETERMINING AXIAL DIRECTION OF BORE OF BONE FIXATOR

(71) Applicant: National Central University, Jhongli (TW)

(72) Inventors: Ching-Shiow Tseng, Jhongli (TW); Pei-Chun Chen, Jhongli (TW); Hung-Kang Wu, Jhongli (TW)

(73) Assignee: National Central University, Jhongli, Taoyuan County (TW)

( * ) Notice: Subject to any disclaimer, the term of this patent is extended or adjusted under 35 U.S.C. 154(b) by 99 days.

(21) Appl. No.: 13/679,758

(22) Filed: Nov. 16, 2012

(65) Prior Publication Data

US 2014/0079301 A1    Mar. 20, 2014

(30) Foreign Application Priority Data

Sep. 14, 2012   (TW) .............................. 101133880 A

(51) Int. Cl.
*G06K 9/00*   (2006.01)
*A61B 5/05*   (2006.01)

(52) U.S. Cl.
USPC ........................... 382/128; 382/296; 600/425

(58) Field of Classification Search
CPC ............. G06K 9/00; A61B 5/05; A61B 17/01
USPC ......... 382/100, 103, 106, 128–134, 162, 168, 382/173, 181, 232, 254, 274, 276, 286–291, 382/295–296, 305, 312; 600/425, 426; 606/96, 62; 378/4, 6, 21
See application file for complete search history.

(56) References Cited

U.S. PATENT DOCUMENTS

| | | | |
|---|---|---|---|
| 2002/0133156 A1* | 9/2002 | Cole | 606/62 |
| 2008/0039845 A1* | 2/2008 | Bonutti et al. | 606/62 |
| 2008/0058829 A1* | 3/2008 | Buscher et al. | 606/96 |
| 2010/0312103 A1* | 12/2010 | Gorek et al. | 600/425 |
| 2011/0166447 A1* | 7/2011 | Windolf et al. | 600/426 |

* cited by examiner

*Primary Examiner* — Seyed Azarian
(74) *Attorney, Agent, or Firm* — Juan Carlos A. Marquez; Morris, Manning & Martin, LLP

(57) ABSTRACT

A method for determining an axial direction of a bore of a bone fixator includes the following steps: obtaining X-ray images of the bore, calculating perpendicular bisectors, determining spatial planes, and obtaining the axial direction of the bore. After X-ray images of the bore are taken from two X-ray source positions, two overlapping images of the bore are obtained for calculating two perpendicular bisectors therein respectively. Each perpendicular bisector and its corresponding X-ray source position define one spatial plane. The intersection of the two spatial planes defines the axial direction of the bore. Now that the axial direction of the bore can be derived from only two X-ray images of the bore taken during an orthopedic surgery, radiation exposure of the patient and of the medical personnel involved can be significantly reduced.

9 Claims, 10 Drawing Sheets

METHOD FOR DETERMINING AXIAL DIRECTION OF BORE OF BONE FIXATOR

BACKGROUND OF THE INVENTION

1. Technical Field

The present invention relates to a method for determining an axial direction of a bore of a bone fixator. More particularly, the present invention relates to such a method for use in an orthopedic surgery.

2. Description of Related Art

It is common practice in the medical treatment to examine the anatomic structures of a human body by means of radiography. This is especially true for orthopedic surgeries, in which it is often necessary to know the real-time condition of a surgical instrument inside the patient's body. A C-arm X-ray machine (hereinafter referred to as C-arm for short) is now extensively used for the task.

A C-arm can show in real time the condition of a surgical instrument or an implant in a human body, so as for a surgeon to decide how a surgical operation should proceed. For example, C-arm images enable a surgeon to know how an intramedullary nail is driven into a bone and how the bores of the intramedullary nail are oriented, before locking screws can be respectively screwed into the bores to secure the intramedullary nail in the bone.

In order to screw a locking screw into a bore of an intramedullary nail, it is conventionally required to take X-ray images of the bore with a C-arm repeatedly so that the relative positions of the bore and a drill bit can be closely observed, ensuring that the drill bit is driven into the bore of the intramedullary nail in the correct direction. The repeated image-taking process, however, subjects the patient, the surgeon, and all the other medical personnel to significant X-ray exposure.

Moreover, as the direction and position of the C-arm need repeated adjustment, and X-ray images must be taken on a regular basis, the duration of the surgical operation will be lengthened. This not only increases the patient's chance of infection but also is physically demanding for the medical personnel. More importantly, the aforesaid conventional approach does not guarantee that a locking screw will be screwed into the intended bore successfully. Therefore, it is imperative to have a method for automatically determining an axial direction of a bore and thereby minimizing the exposure of radiation.

BRIEF SUMMARY OF THE INVENTION

The present invention provides a method for determining an axial direction of a bore of a bone fixator, wherein the method includes the steps of: obtaining images of the bore, calculating perpendicular bisectors, determining spatial planes, and obtaining the axial direction of the bore. The present invention is characterized in that the axial direction of the bore can be determined by calculating with only two X-ray images of the bore. Thus, not only can a surgeon screw a locking screw into the bore more efficiently to fix the bone fixator in a bone, but also the dose of radiation to which the patient and the medical personnel involved are exposed can be reduced.

The present invention provides a method for determining an axial direction of a bore of a bone fixator, executable in a computer system, the method comprising the steps of: obtaining X-ray images of the bore, wherein X-ray images of the bore are taken from a first position to obtain a first overlapping image of a first bore surface and a second bore surface of the bore, and from a second position to obtain a second overlapping image of the first bore surface and the second bore surface; calculating perpendicular bisectors, wherein the first overlapping image and the second overlapping image are separately processed by a processing unit so as to obtain through calculation a first perpendicular bisector in the first overlapping image and a second perpendicular bisector in the second overlapping image; determining spatial planes, wherein the first position and the first perpendicular bisector define a first plane, and the second position and the second perpendicular bisector define a second plane; and obtaining the axial direction of the bore, wherein the processing unit calculates an intersection of the first plane and the second plane, and the intersection defines the axial direction of the bore.

Implementation of the present invention at least produces the following advantageous effects:

1. It takes only two images of a bore to determine an axial direction of the bore. Hence, the dosage of radiation received by patients and medical personnel can be reduced.

2. The duration of a surgical operation can be shortened to reduce the patient's risk of infection.

3. It becomes easier to guide a drill bit/K-pin along an axial direction of a bore during the drilling process and therefore easier to screw a locking screw into the bore.

The detailed features and advantages of the present invention will be described in detail with reference to the preferred embodiment so as to enable persons skilled in the art to gain insight into the technical disclosure of the present invention, implement the present invention accordingly, and readily understand the objectives and advantages of the present invention by perusal of the contents disclosed in the specification, the claims, and the accompanying drawings.

DETAILED DESCRIPTION OF THE INVENTION

Figure 1:
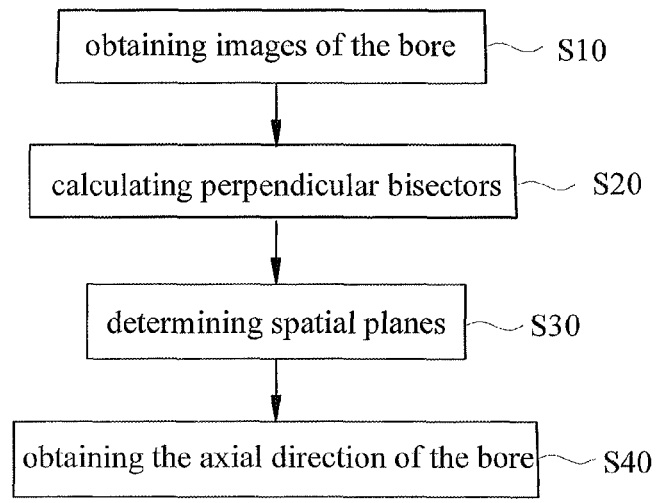
FIG. 1 is the flowchart of a method for determining an axial direction of a bore of a bone fixator according to an embodiment of the present invention.

According to an embodiment of the present invention as shown in FIG. 1, a method S100 for determining an axial direction of a bore of a bone fixator is to be executed in a computer system and includes the steps of: obtaining images of the bore (step S10), calculating perpendicular bisectors (step S20), determining spatial planes (step S30), and obtaining the axial direction of the bore (step S40).

Figure 2:
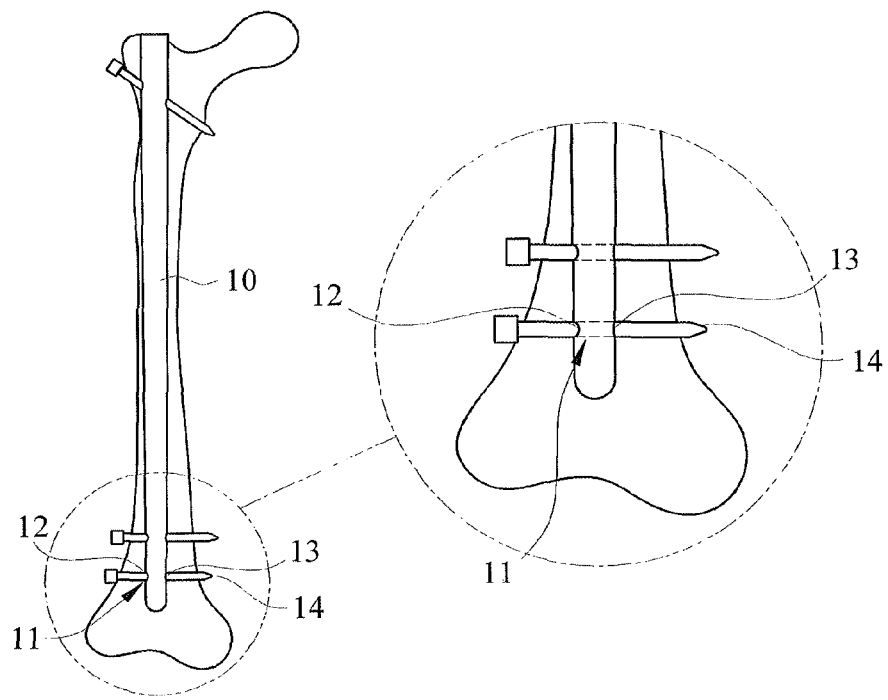
FIG. 2 schematically shows an intramedullary nail and its bores in an embodiment of the present invention.
Figure 3:
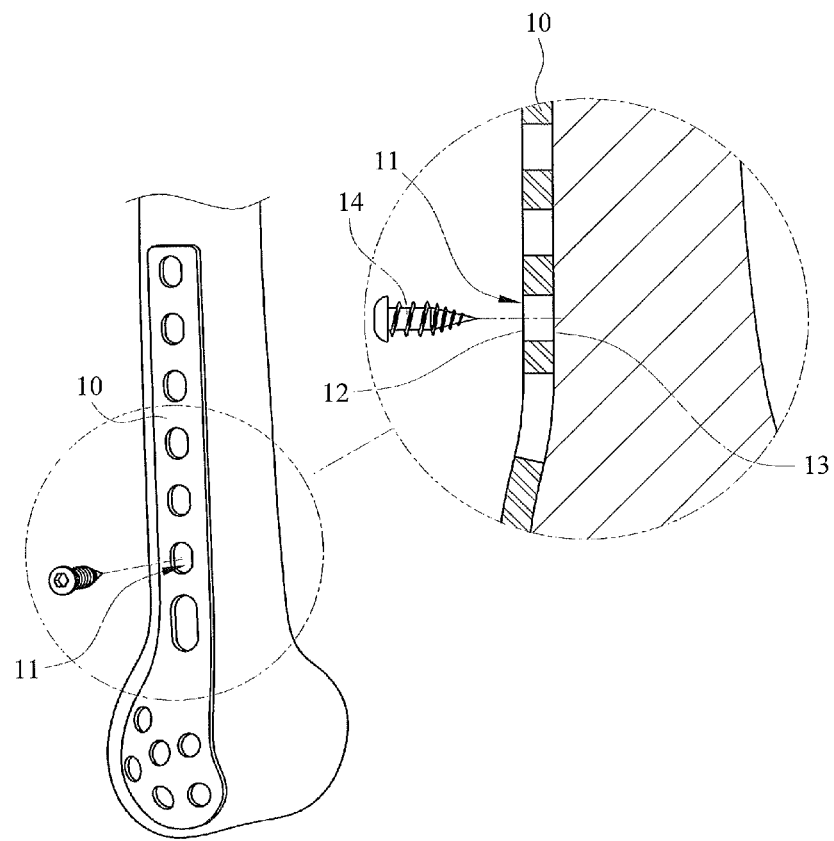
FIG. 3 schematically shows a bone plate and its bores in an embodiment of the present invention.

As shown in FIG. 2 and FIG. 3, the bone fixator 10 is formed with at least one bore 11. The bore 11 penetrates the bone fixator 10 and forms a first bore surface 12 and a second bore surface 13 on two opposite surfaces of the bone fixator 10 respectively. More specifically, the first bore surface 12 is a curved bore surface formed on the bone fixator 10 at a first end of the bore 11, and the second bore surface 13 is a curved bore surface formed on the bone fixator 10 at a second end of the bore 11. The bone fixator 10 may be a bone nail such as an intramedullary nail or gamma nail, which is implanted in the medullary cavity of a fractured long bone (e.g., femur or tibia) to hold the broken parts of the bone in place. If the bone fixator 10 is an intramedullary nail, it is necessary to insert a locking screw 14 through the bore 11 after the intramedullary nail is driven into the medullary cavity of a long bone, so as for the intramedullary nail to stay securely in the long bone. The bore 11 in this case extends from one end to the other end of a diameter of the intramedullary nail and forms the first bore surface 12 and the second bore surface 13 on two opposite surfaces of the intramedullary nail respectively.

The bone fixator 10 may also be a bone plate as shown in FIG. 3. A bone plate is provided outside a fractured bone to secure the broken parts of the bone in position. After a bone plate is attached to a bone, it is also necessary to insert a locking screw 14 through the bore 11 so that the bone plate can be firmly fixed to the outer surface of the bone. The bore 11 in this case penetrates two opposite plate surfaces of the bone plate and forms the first bore surface 12 and the second bore surface 13 on the two opposite plate surfaces respectively.

Figure 4A:
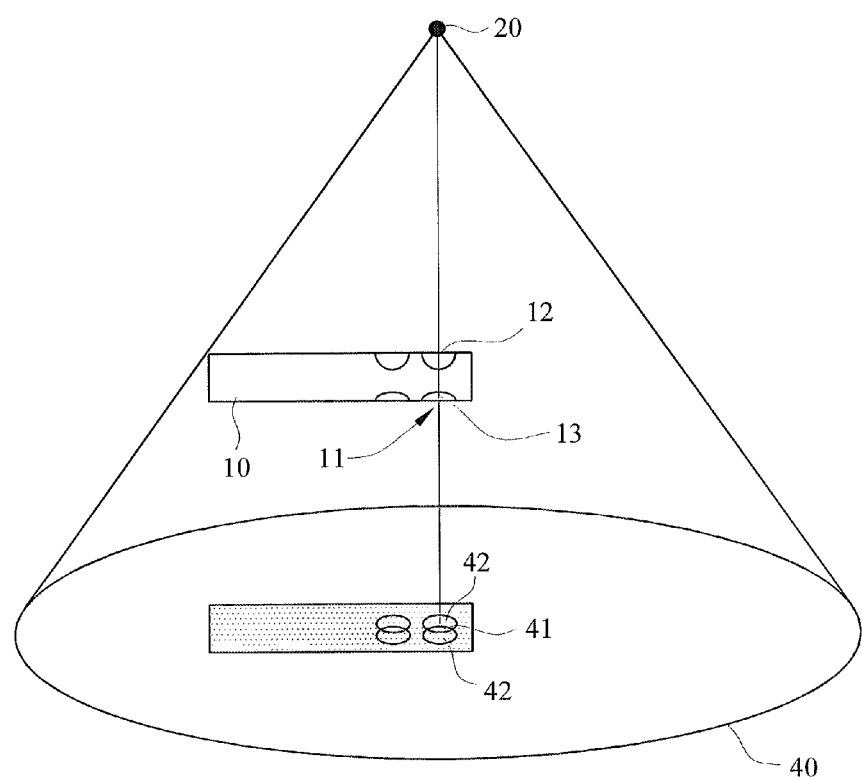
FIG. 4A schematically shows an instance of an overlapping image in an embodiment of the present invention.
Figure 4B:
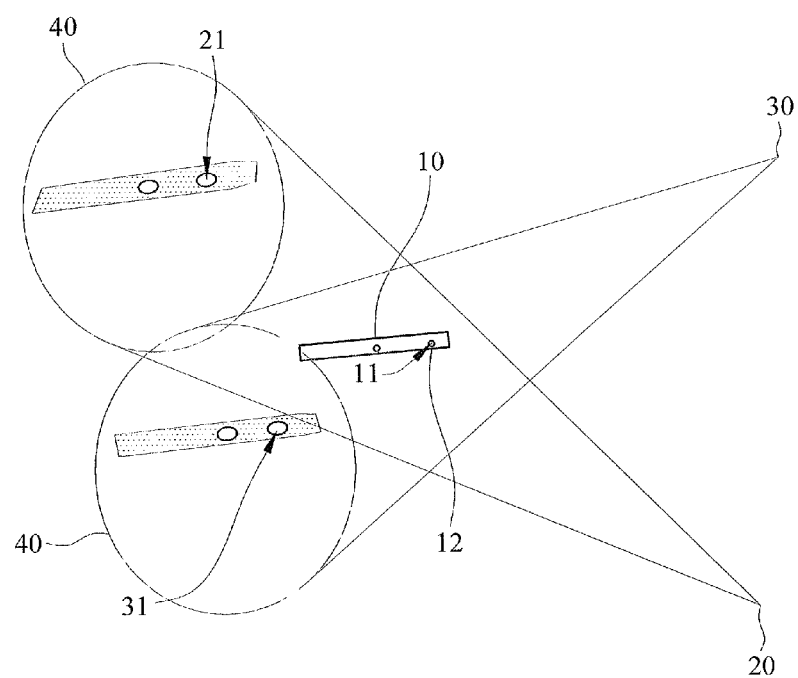
FIG. 4B schematically shows how images of a bore are obtained according to an embodiment of the present invention.

The step of obtaining images of the bore (step S10) is now described with reference to FIG. 4A and FIG. 4B. In order to take X-ray images of the bone fixator 10 and the bore 11 with a C-arm during an orthopedic surgery, the image-taking position of the C-arm is typically adjusted by rotating along a plane which passes through the axial direction of the bore 11 and is perpendicular to the longitudinal direction of the bone fixator 10. When an X-ray image of the bone fixator 10 and the bore 11 is taken with the X-ray source of the C-arm being located at a first position 20 on the aforesaid plane, X rays pass through the overlapping portion of the first bore surface 12 and second bore surface 13 and reach the detector of the C-arm. As a result, the part of the detector that corresponds to the overlapping portion is exposed to more X-ray radiation than that corresponding to the non-overlapping portion, and a high-brightness area 41 is formed in the X-ray image 40 thus taken. In the non-overlapping portion of the first bore surface 12 and second bore surface 13, however, X rays pass through only the first bore surface 12 but not the second bore surface 13 or vice versa. Since the part of the detector that corresponds to the non-overlapping portion is exposed to less X-ray radiation than that corresponding to the overlapping portion, two low-brightness areas 42 are formed in the X-ray image 40. By subjecting the X-ray image 40 to image processing (e.g., image identification and segmentation), the high-brightness area 41 is obtained as a first overlapping image 21 of the first bore surface 12 and second bore surface 13 of the bore 11.

Similarly, a second X-ray image 40 is taken of the bore 11, with the X-ray source of the C-arm being located at a second position 30 on the aforesaid plane instead. The second X-ray image 40 is subjected to image processing (e.g., image identification and segmentation) so as to obtain the high-brightness area 41 of the second X-ray image 40. This high-brightness area 41 is defined as a second overlapping image 31 of the first bore surface 12 and second bore surface 13 of the bore 11. Both the first overlapping image 21 and the second overlapping image 31 can be taken with the C-arm. The first position 20 and the second position 30 refer to the positions of the X-ray source of the C-arm when taking the images.

Figure 4C:
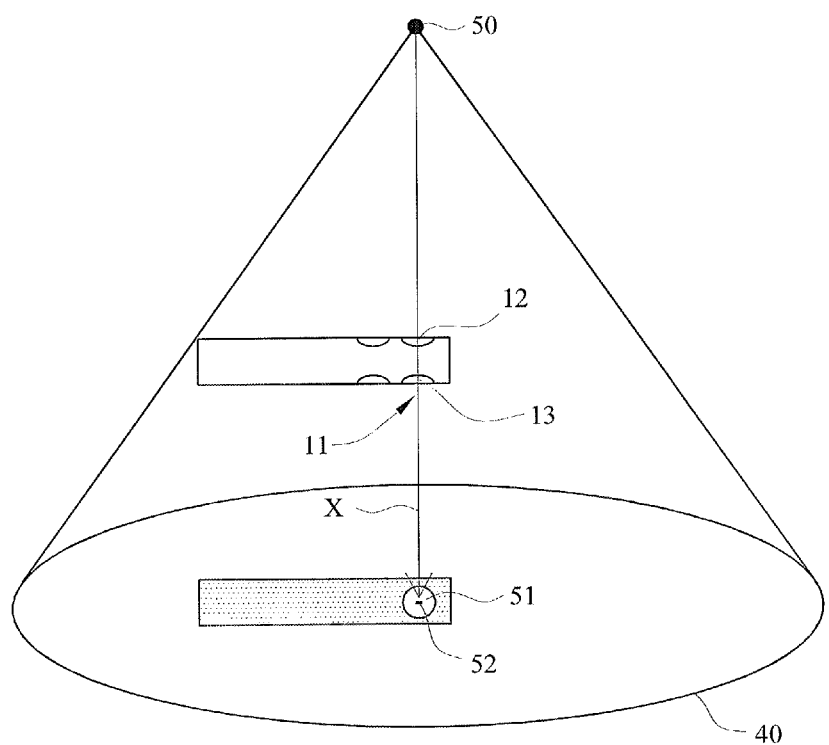
FIG. 4C schematically shows another instance of an overlapping image in an embodiment of the present invention.

Referring to FIG. 4C, the step of obtaining images of the bore (step S10) may further include a sub-step of identifying a complete overlap. When an X-ray image of the bore 11 is taken from a central position 50 right above the bore 11, the first bore surface 12 and the second bore surface 13 of the bore 11 substantially or completely overlap each other in the central-axis direction of the X rays. Therefore, the image generated by the X rays passing through the first bore surface 12 to the detector of the C-arm completely overlaps the image generated by the X rays passing through the second bore surface 13 to the detector of the C-arm. In other words, the resultant first overlapping image 21 or second overlapping image 31 is a completely overlapping image 51 identical in shape to the first bore surface 12 or the second bore surface 13. In such a case, the line defined by the central position 50 and the center 52 of the completely overlapping image 51 defines the axial direction of the bore 11.

Figure 5A:
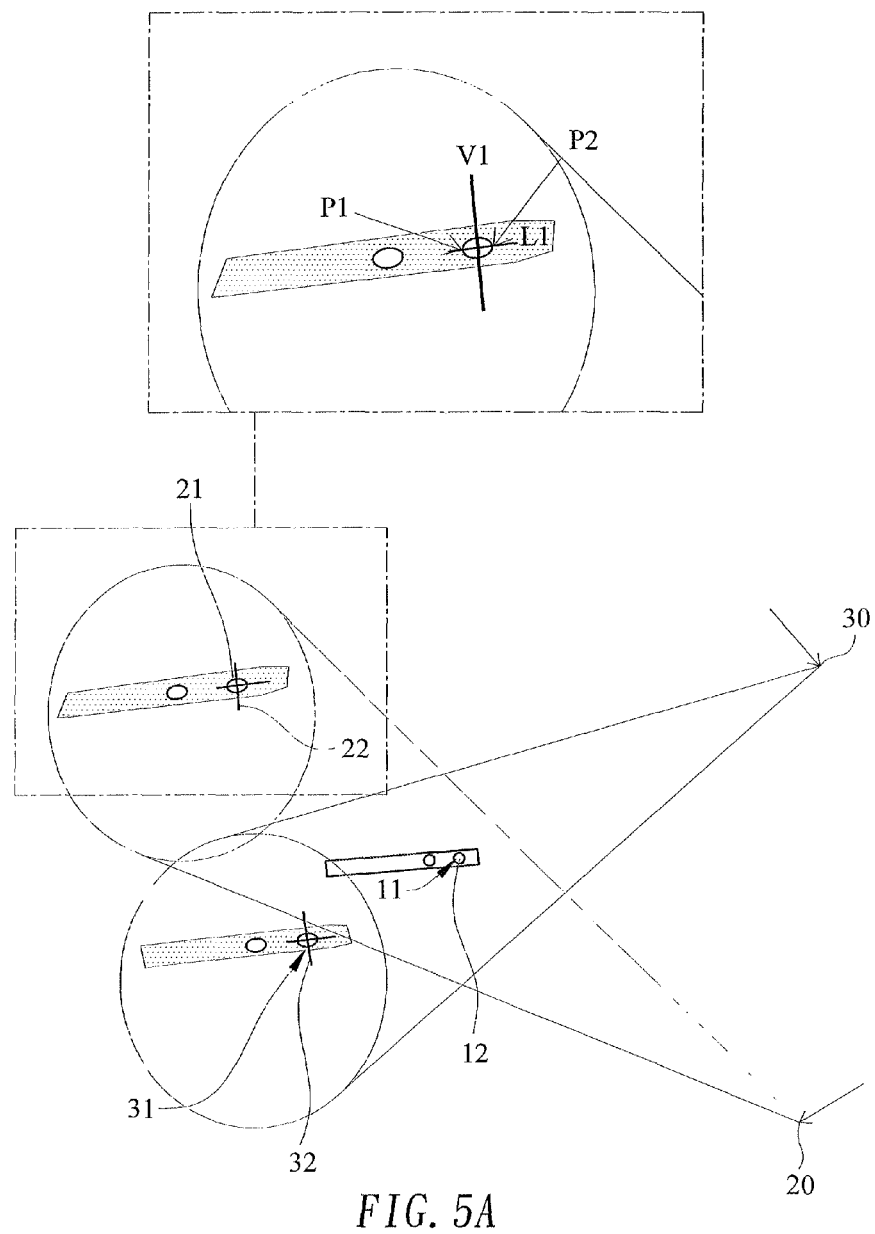
FIG. 5A schematically shows the step of calculating perpendicular bisectors in an embodiment of the present invention.
Figure 5B:
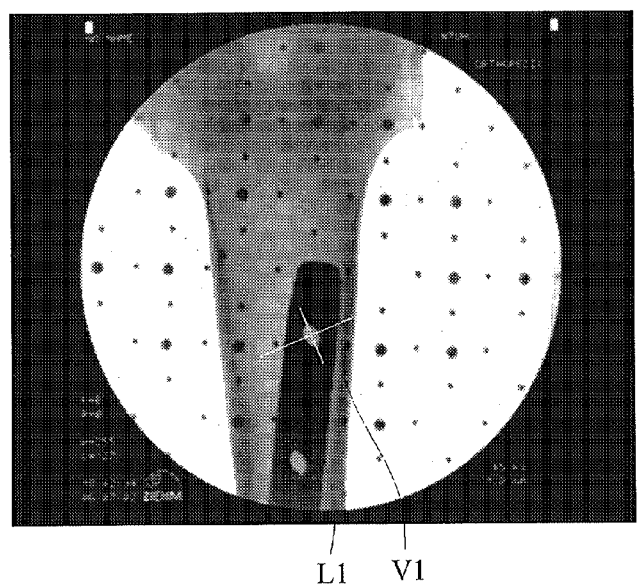
FIG. 5B is an X-ray image showing a perpendicular bisector in FIG. 5A.

Referring to FIG. 5A and FIG. 5B, the step of calculating perpendicular bisectors (step S20) is carried out by a processing unit and entails separately processing the first overlapping image 21 and the second overlapping image 31 obtained from the step of obtaining images of the bore (step S10). More specifically, the step of calculating perpendicular bisectors (step S20) takes advantage of the fact that the first overlapping image 21 resembles an ellipse. The two major-axis vertices (P1 and P2) of the ellipse are connected to form a line segment L1, and the perpendicular bisector V1 of the line segment L1 is calculated as a first perpendicular bisector 22. Similarly, by viewing the second overlapping image 31 as an ellipse, the two major-axis vertices (P1 and P2) of this ellipse are connected to form a line segment L1, and the perpendicular bisector V1 of this line segment L1 is calculated as a second perpendicular bisector 32.

Figure 6A:
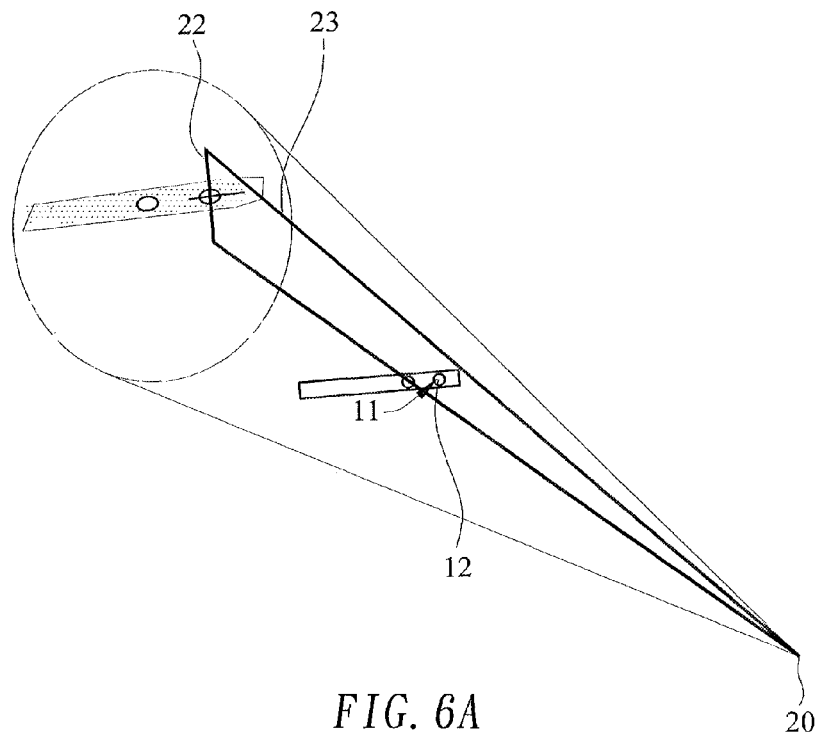
FIG. 6A to FIG. 6C schematically show the step of determining spatial planes in an embodiment of the present invention.
Figure 6B:
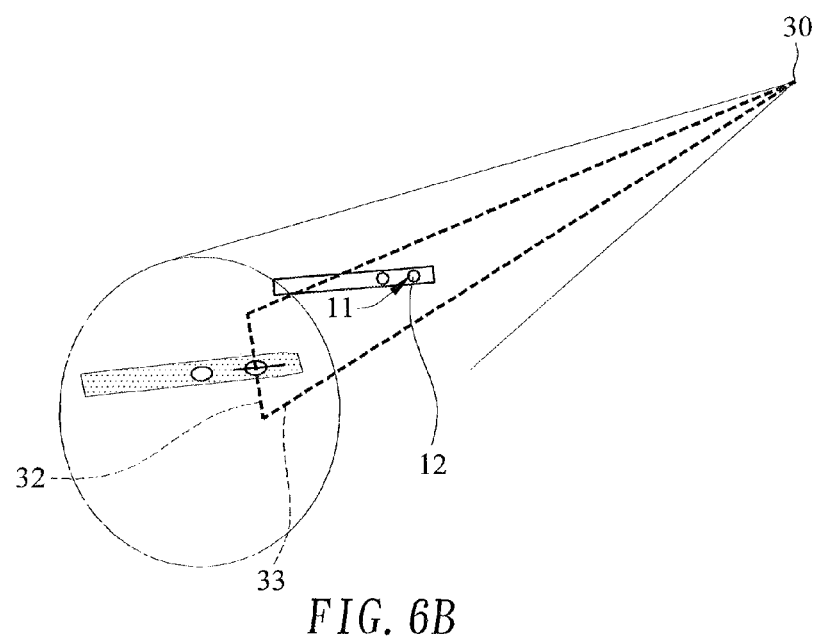

The step of determining spatial planes (step S30) is detailed as follows. Referring to FIG. 6A and FIG. 6B, as a plane can be defined by a point and a line, the first position 20 and the first perpendicular bisector 22 obtained from the step of calculating perpendicular bisectors (step S20) define a first plane 23, and the second position 30 and the second perpendicular bisector 32 obtained from the step of calculating perpendicular bisectors (step S20) define a second plane 33.

Figure 6C:
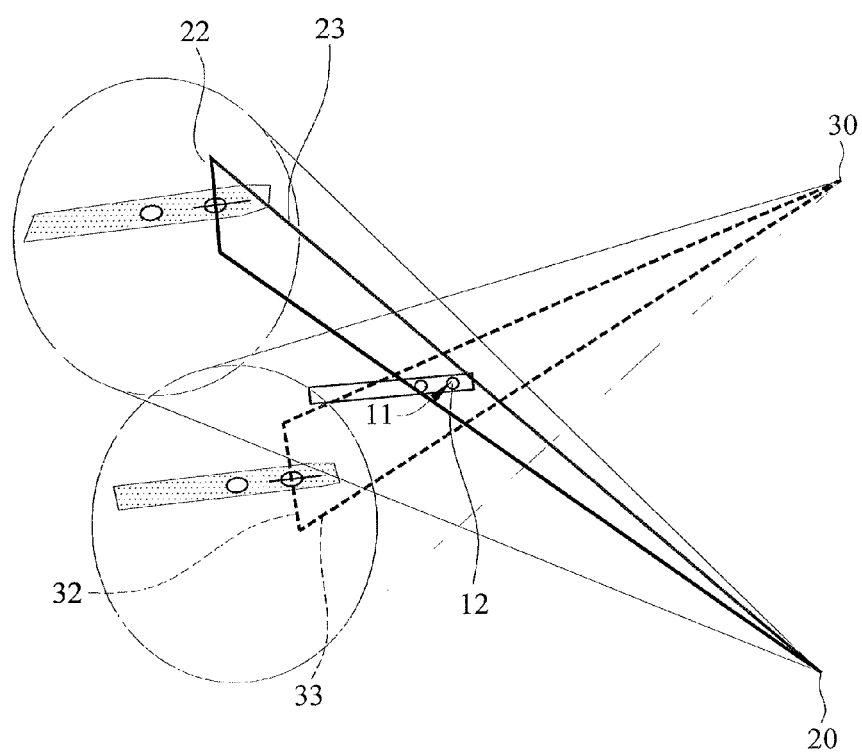
Figure 7:
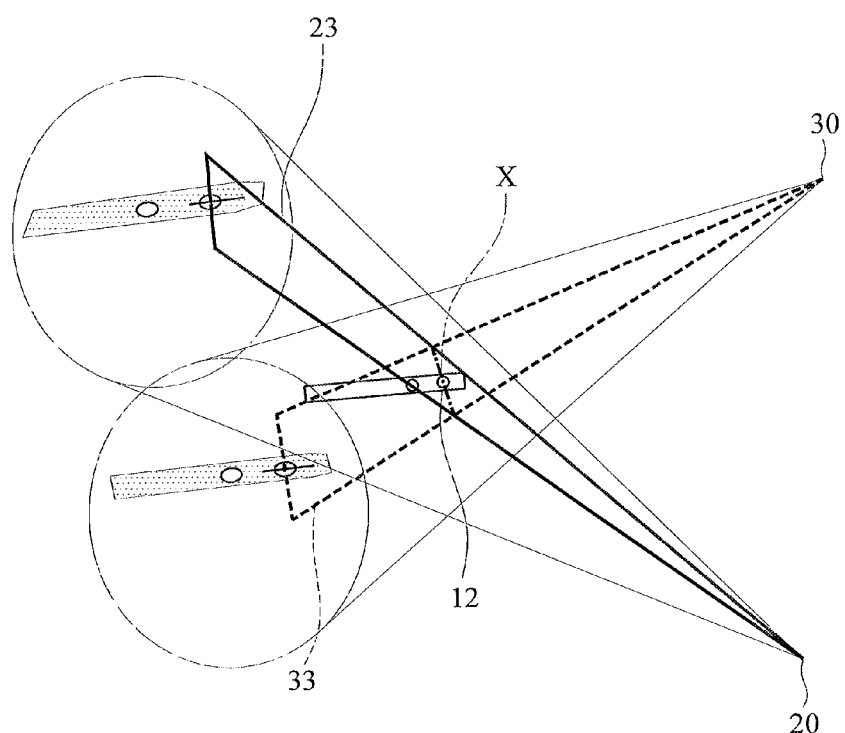
FIG. 7 schematically shows how an axial direction of a bore is obtained according to an embodiment of the present invention.

Next, referring to FIG. 6C and FIG. 7, the step of obtaining the axial direction of the bore (step S40) is performed by the processing unit calculating the intersection of the first plane 23 and the second plane 33, and the intersection defines the axial direction X of the bore 11. In a surgical navigation system, the coordinates of the X-ray source and the coordinates of the detector of a C-arm can be determined with a positioning device with an image calibrator and then used in conjunction with the method of the present invention to derive the coordinates defining the axial direction X of a bore. Thus, based on the axial direction X of the bore, the surgical navigation system can assist a surgeon in screwing a locking screw into the bore.

The method disclosed in the foregoing embodiment for determining an axial direction of a bore allows the axial direction of the bore to be derived from only two X-ray images of the bore. When used in an orthopedic surgery, the disclosed method can increase the efficiency of the surgical operation, lower the dosage of radiation to which the medical personnel involved are exposed, and ensure that a drill bit/K-pin is driven along the axial direction of the bore, so as for a locking screw to lock, for example, an intramedullary nail or gamma nail effectively.

The features of the present invention are disclosed above by the preferred embodiment to allow persons skilled in the art to gain insight into the contents of the present invention and implement the present invention accordingly. The preferred embodiment of the present invention should not be interpreted as restrictive of the scope of the present invention. Hence, all equivalent modifications or amendments made to the aforesaid embodiment should fall within the scope of the appended claims.

What is claimed is:

1. A method for determining an axial direction of a bore of a bone fixator, executable in a computer system, the method comprising the steps of:
   obtaining images of the bore, wherein images of the bore are taken from a first position to obtain a first overlapping image of a first bore surface and a second bore surface of the bore, and from a second position to obtain a second overlapping image of the first bore surface and the second bore surface;
   calculating perpendicular bisectors, wherein the first overlapping image and the second overlapping image are separately processed by a processing unit so as to obtain through calculation a first perpendicular bisector in the first overlapping image and a second perpendicular bisector in the second overlapping image;
   determining spatial planes, wherein the first position and the first perpendicular bisector define a first plane, and the second position and the second perpendicular bisector define a second plane; and
   obtaining the axial direction of the bore, wherein the processing unit calculates an intersection of the first plane and the second plane, and the intersection defines the axial direction of the bore.

2. The method of claim 1, wherein the bone fixator is an intramedullary nail, a gamma nail or a bone plate.

3. The method of claim 1, wherein the bore extends from one end to an opposite end of a diameter of the bone fixator and forms the first bore surface and the second bore surface on two opposite surfaces of the bone fixator respectively.

4. The method of claim 1, wherein the bore penetrates two opposite plate surfaces of the bone fixator and forms the first bore surface and the second bore surface on the two opposite plate surfaces respectively.

5. The method of claim 1, wherein both the first overlapping image and the second overlapping image are taken with a C-arm X-ray machine.

6. The method of claim 1, wherein the first overlapping image and the second overlapping image are obtained through image processing.

7. The method of claim 1, wherein the step of obtaining images of the bore further comprises the sub-step of identifying a complete overlap, the sub-step comprising identifying the first overlapping image or the second overlapping image as a completely overlapping image and connecting a central position to a center of the completely overlapping image to form a line defining the axial direction of the bore.

8. The method of claim 1, wherein the first perpendicular bisector is a perpendicular bisector of a line segment formed by connecting two major-axis vertices of the first overlapping image.

9. The method of claim 1, wherein the second perpendicular bisector is a perpendicular bisector of a line segment formed by connecting two major-axis vertices of the second overlapping image.

* * * * *